US008646443B2

(12) United States Patent
Deb et al.

(10) Patent No.: US 8,646,443 B2
(45) Date of Patent: Feb. 11, 2014

(54) ELECTROCHEMICALLY REACTING COMPOSITION AND A PROCESS FOR THE PREPARATION THEREOF

(75) Inventors: Pramil C. Deb, Maharashtra (IN); Arun Kumar Shah, Maharashtra (IN); Daya Lama, Maharashtra (IN)

(73) Assignee: The Additional Director (IPR), Defence Research & Development Organisation, New Delhi (IN)

( * ) Notice: Subject to any disclaimer, the term of this patent is extended or adjusted under 35 U.S.C. 154(b) by 2441 days.

(21) Appl. No.: 10/517,002

(22) PCT Filed: Apr. 7, 2003

(86) PCT No.: PCT/IN03/00148
§ 371 (c)(1),
(2), (4) Date: Jun. 30, 2005

(87) PCT Pub. No.: WO03/104529
PCT Pub. Date: Dec. 18, 2003

(65) Prior Publication Data
US 2005/0274934 A1  Dec. 15, 2005

(30) Foreign Application Priority Data
Jun. 5, 2002  (IN) .............. 612/DEL/2002

(51) Int. Cl.
*A47J 36/30*  (2006.01)

(52) U.S. Cl.
USPC . 126/263.01; 126/204; 428/548; 252/182.33; 252/183.14; 252/186.24

(58) Field of Classification Search
USPC ........... 252/182.33, 183.14, 186.24; 428/548; 126/263.01, 204
See application file for complete search history.

(56) References Cited

U.S. PATENT DOCUMENTS

| 2003/0000517 A1* | 1/2003 | Joseph et al. ............ 126/263.06 |
| 2004/0042965 A1* | 3/2004 | Usui et al. ....................... 424/40 |

FOREIGN PATENT DOCUMENTS

| JP | 54153349 A | 12/1979 |
| JP | 5620450 A | 2/1981 |
| JP | 5652057 A | 5/1981 |
| JP | 58011581 A | 1/1983 |

* cited by examiner

*Primary Examiner* — Arun S Phasge
(74) *Attorney, Agent, or Firm* — The Webb Law Firm

(57) ABSTRACT

An electrochemically reacting composition which can be utilized as a source of heat as well as hydrogen, comprising the active materials aluminum, magnesium and iron, a filler material such as a silica sand, a hydrogen scavenger such as potassium permanganate, additives such as sodium silicate and an electrolyte such as sodium chloride.

14 Claims, 2 Drawing Sheets

Temperature Profile

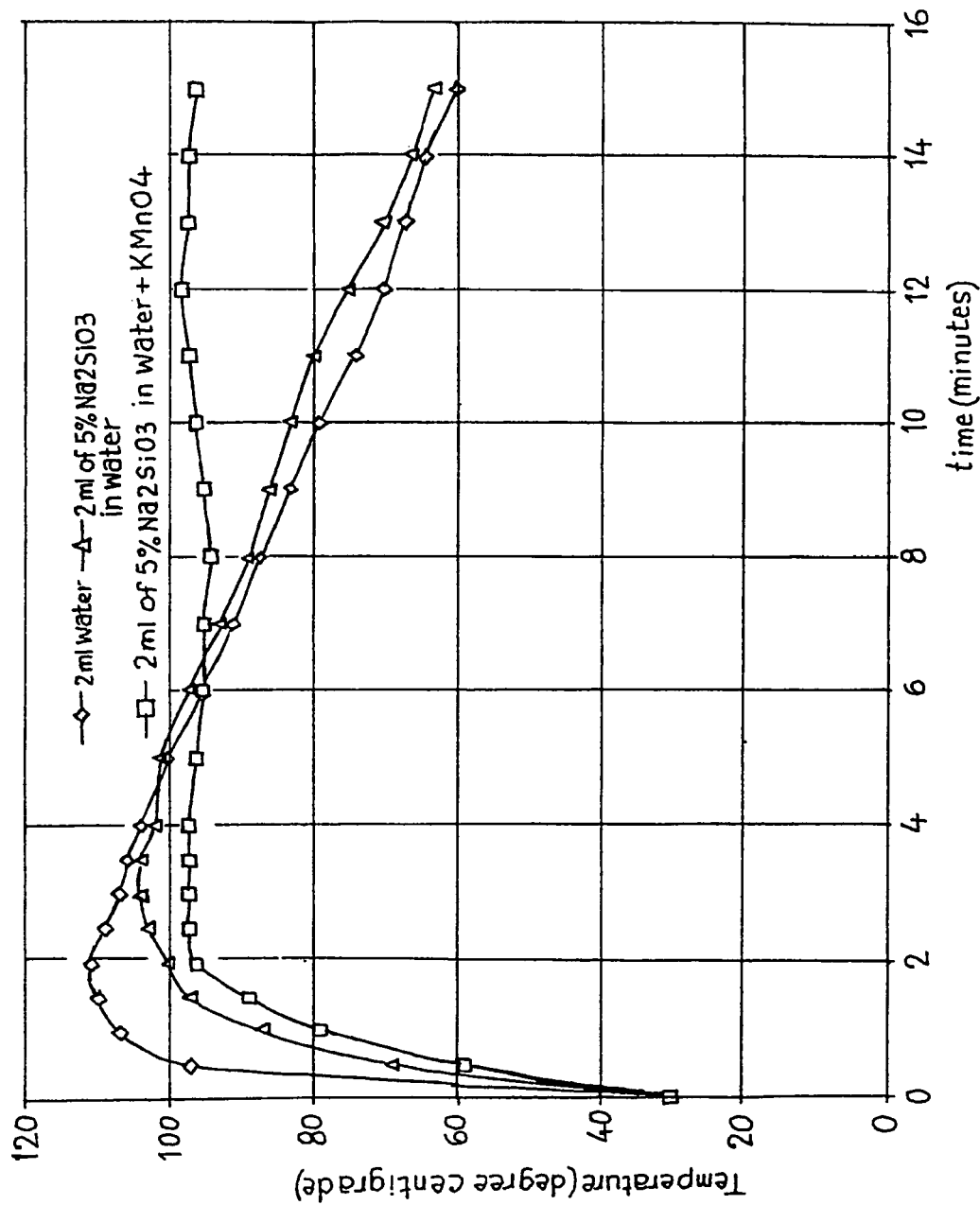
Fig. 1 Temperature Profile

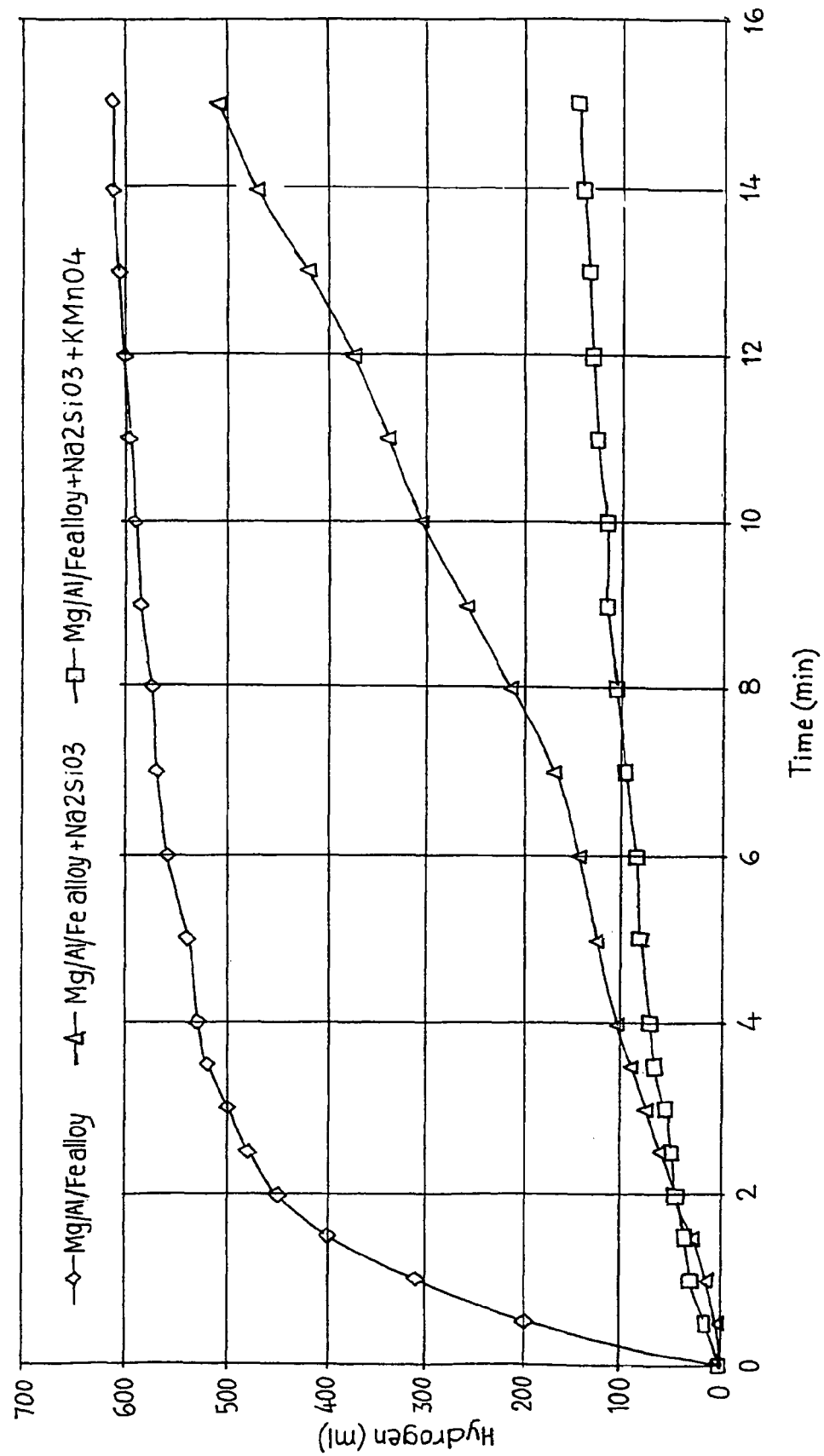
Fig. 2 Hydrogen evolution

ELECTROCHEMICALLY REACTING COMPOSITION AND A PROCESS FOR THE PREPARATION THEREOF

CROSS-REFERENCE TO RELATED APPLICATIONS

This application is a national stage application of International Application No. PCT/IN03/00148, filed Apr. 7, 2003, which claims priority to Indian Application No. 612/Del/2002, filed on Jun. 5, 2002.

FIELD OF INVENTION

This invention relates to an electrochemically reacting composition and a process for preparation thereof.

PRIOR ART

Electrochemically reacting compositions are used as source for rapid generation of heat and hydrogen, which comes out during the electrochemical reaction when an electrolyte solution of salt and water is added to these heat-producing compositions. As such, these compositions are used as portable flame-less heaters for heating food packets, human bodies, instruments etc. These heat-producing compositions can also be conveniently packed into suitable small size pouches for carrying purposes and stored over a long period of time. These compositions are also employed in variety of applications, which need heat source. For example, the composition pellet can be used as a 'test heat source' for testing of heat sensors. As, during the above electrochemical reaction, hydrogen also comes out as a by-product, these compositions can also be utilized as a source of hydrogen. The hydrogen can be utilized for fuel cell applications as well as buoyancy applications required for under water operations. However, when these electrochemically reacting compositions are used as heat-producing elements, the evolution of hydrogen during the electrochemical reaction is not desirable as it may become hazardous if produced in large quantity. These electrochemical heat sources essentially comprise magnesium, an active metal, and iron, a passive metal. The electrochemical reaction, in the presence of salt dissolved in water, occurs at microscopic level between the relatively noble metal like iron acting as a cathode and a relatively less noble metal like magnesium acting as anode. This reaction takes place in the presence of an electrolyte such as sodium chloride dissolved in the water. The reaction, taking place at the anode, can be shown as:

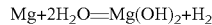
$$Mg + 2H_2O = Mg(OH)_2 + H_2$$

This is an exothermic reaction, which releases 14.67 Kilo Joule of heat for each gram of magnesium. Additionally, it also releases 0.9 ml of hydrogen for each gram of magnesium used.

The electrochemically reacting compositions, containing Magnesium and iron, are well known in the art for producing heat and hydrogen. A variety by heat producing devices utilizing these compositions are also well known to the art. However, these compositions known to the prior art, suffer from the following disadvantages.

Primary disadvantage of these electrochemically reacting compositions, well known in the prior art, is that these compositions mainly utilize magnesium, which is very costly.

Another disadvantage of these electrochemically reacting compositions, well known in the prior art, is that these compositions are unable to produce heat over a longer period of time.

Still another disadvantage of these electrochemically reacting compositions, well known in the prior art, is that these compositions produce lower heat output per unit weight of the composition.

Yet further disadvantage of these electrochemically reacting compositions, well known in the prior art, is that these compositions require more amount of water per unit weight of the composition for entire electrochemical process.

Still further disadvantage of these electrochemically reacting compositions, well known in the prior art, is that in this case the reaction rate can not be conveniently controlled.

OBJECTS OF THE INVENTION

Primary object of the invention is to provide an electrochemically reacting composition and a process for preparation thereof, which can be used as a source of heat as well as hydrogen.

Another object of the invention is to provide an electrochemically reacting composition and a process for preparation thereof, which utilizes aluminum, in addition to magnesium as a constituent, thereby making the composition less costly.

Yet another object of the invention is to provide an electrochemically reacting composition and a process for preparation thereof, which is capable of providing higher energy out put per unit weight of the entire composition.

Still another object of the invention is to provide an electrochemically reacting composition and a process for preparation thereof, which utilizes potassium permaganate ($KmnO_4$) as scavenger of hydrogen thereby reducing any risk involved in the emission of hydrogen during the electrochemical reaction.

Yet further object of the invention is to provide an electrochemically reacting composition and a process for preparation thereof, wherein the extent of hydrogen emission can be favourably controlled by varying the amount of potassium permanganate used in the composition.

Still further object of the invention is to provide an electrochemically reacting composition and a process for preparation thereof, wherein the potassium permanganate reacts with the nascent hydrogen to produce more heat and thereby sustaining the process of heat generation over a longer period of time.

Yet further object of the invention is to provide an electrochemically reacting composition and a process for preparation thereof, which can be conveniently given and shape through compacting for utilization as heat source for food packets, human bodies, instruments etc.

Still further object of the invention is to provide an electrochemically reacting composition and a process for preparation thereof, wherein the reaction rate can be conveniently varied to control the heat output by varying the ratio of magnesium and almunium used as well as by addition of filler materials like silica etc. in the composition.

Yet further object of the invention is to provide an electrochemically reacting composition and a process for preparation thereof, which can be utilized in any environment including high altitude, extremely low temperature and under water environments.

Still further object of the invention is to provide an electrochemically reacting composition and a process for preparation thereof, which is non-toxic.

Yet further object of the invention is to provide an electrochemically reacting composition and a process for preparation thereof, which is safer to handle.

Still further object of the invention is to provide an electrochemically reacting composition and a process for preparation thereof, which does not produce any toxic substance as a by-product during the electrochemical reaction.

Yet further object of the invention is to provide an electrochemically resting composition and a process for preparation thereof, which uses environment friendly silica sand as a filler material.

Yet further object of the invention is to provide an electrochemically reacting composition and a process for preparation thereof, wherein the process for preparation is very simple.

DESCRIPTION OF THE INVENTION

According to this invention there is provided an electrochemically reacting composition comprising active materials aluminum magnesium and iron, a filler material such as silica sand, a hydrogen scavenger such as potassium permanganate, additive such as sodium silicate and an electrolyte such as sodium chloride;

wherein said magnesium comprises 10-90% by weight of the said active materials;

wherein said aluminum comprises 10-90% by weight of the said active materials;

wherein said iron comprises 0-15% by weight of the said active materials;

wherein said filler material silica sand comprises 5-50% by weight of the said active materials;

wherein said hydrogen scavenger potassium permanganate comprises 5-30% by weight of the said composite materials;

wherein said additive sodium silicate comprises 0-20% by weight of the said active materials.

Further according to this invention there is provided a process for the preparation of an electrochemically reacting composition comprising following steps:

(i) preparing active materials by placing commercially available 10-90%, preferably 15-50% magnesium, having particle size varying from 1-500 µm, by weight of the entire active materials, 10-90% preferably 40-75% almunium, having particle size varying from 2-100 µm, by weight of the entire active materials, and 0-15%, preferably 7-12% iron, having particle size varying from 20-200 weight wise of the entire active materials in the container of a conventional ball mill;

(ii) adding to the said active materials a filler material such as silica sand 5-50% preferably 5-25% weight wise over the weight of the said active materials;

(iii) ball milling the mix of the said active materials and the said filler material for about 4-6 hours preferably under the inert atmosphere of argon and transferring the entire mix to another container after completion of the ball milling operation.

(iv) adding a hydrogen scavenger such as copper chloride, ferric chloride preferably potassium permanganate 5-30% preferably 5-20% weight wise over the entire weight of the active materials and mixing thoroughly to obtain a homogenous mix;

(v) adding additive sodium silicate 2-20% preferably 2-10% weight wise over the entire active materials to the homogenous mix obtained from step (iv);

(vi) adding any salt of strong acid and strong/weak base such as potassium chloride, ferrous, sulphate preferably sodium chloride 2-10% preferably 5-10% weight wise over the weight of the entire active materials to the mix obtained from step (v);

(vii) compacting of the entire mix obtained from step (v) through a conventional pressing machine and giving it a desirable shape such as strip or pellet.

(vii) Storing the compacted and cut electrochemical heat source in air tight containers such as pouch to avoid ingress of water.

In accordance with this invention magnesium comprises 15 to 50% by weight with a particle size of 1 to 500 µm, aluminum comprises 40-75% having particle size varying from 2-100 µm, by weight of the said active materials; iron comprises 7-12%, having particle size varying from 20-200 µm, by weight of the said active materials, silica sand comprises 5-25% by weight of the said active materials; potassium permanganate comprises preferably 5-20% by weight of the said composite materials; sodium silicate comprises preferably 0-10% by weight of the said active materials.

The heat producing electrochemically reacting composition of the present invention comprises active materials almunium, magnesium and iron, a filler material such as silica sand, additives like sodium silicate, potassium permanganate, and a salt such as sodium chloride. A small quantity of water is added to this composition, depending upon the quantity of active materials in this composition, whenever production of heat is required. Alternatively, the active materials almunium, magnesium and iron, and filler material silica sand can be compacted and packed separately in a convenient pouch while the electrolyte solution of salt and water with additive potassium permanganate and sodium silicate can be separately packed in another pouch. These two pouches can be carried separately and the contents of these pouches can be mixed together when generation of heat is required.

The electrochemically reacting composition of the present invention employs a mix of aluminum and magnesium in addition to magnesium as active materials as compared to the prior art wherein only magnesium and iron are used as active materials. Although aluminum provides more heat per unit of its weight as compared to magnesium, it suffers from the disadvantage that its electrochemical reacting rate for producing heat is slower at lower temperature. While in case of magnesium, the electrochemical reaction rate for producing heat is higher even at lower temperatures. In the present case, which utilizes a mix of aluminum and magnesium as reactive materials, it is magnesium, which initiates the electrochemical reaction. Initially, when the temperature is lower, magnesium initiates the electrochemical reaction generating the heat. Subsequently, as the temperature rises, aluminum also becomes active and starts producing heat by taking part in the electrochemical process. The amount of heat, evolved during the electrochemical reaction, depends upon the total quantity of aluminum and magnesium employed in the composition. The filler material silica sand works as a heat sink and helps in making a homogeneous mix of active materials and iron during the mixing operation in the ball mill. Potassium permanganate plays an extremely important role during the electrochemical reaction. At one level, it reacts with the nascent hydrogen evolved during the electrochemical reaction to produce more hear thus adding to the heat generated during the reaction and thereby sustaining the heat generation process over a longer duration of time. At another level, it also produces water when it reacts with hydrogen thereby reducing the requirement of water to start the electrochemical reaction itself. Additionally, it also acts as a scavenger of hydrogen as it removes undesirable hydrogen, produced during the electrochemical reaction, by reacting with it and producing more heat and water. Sodium silicate acts as a gelling agent and when used together with potassium permanganate, it helps in sustaining the generation of heat over a longer duration.

The reaction, involved during the above process can be shown in the following $$Mg+2H_2O=Mg(OH)_2+H_2$$

$$2Al+6H_2O=2Al(OH)_3+3H_2$$

$$2KMnO_4+3H_2=K_2O+2MnO_2+3H_2O$$

DESCRIPTION OF THE DRAWINGS

FIG. 1 shows the temperature-time profile of the electrochemically reacting composition of the present invention in the presence of water, mixture of sodium silicate and water, and mixture of sodium silicate, water and potassium permanganate.

FIG. 2 shows the hydrogen evolution profile of the electrochemically reacting composition of the present invention in the presence of water, mixture of sodium silicate and water, and mixture of sodium silicate, water and potassium permanganate.

Referring to FIG. 1, it shows the temperature profile of the reaction with time indicating the extent of heat evolved during the electrochemical reaction in a typical situation. In a situation, when potassium permanganate and sodium silicate are not used as additives, the temperature of the reaction, increases sharply with time but after some time, it starts decreasing with time. It signifies that the generation of heat is not a sustained one over the period of time. In case, when only sodium silicate is used as an additive in the composition, the temperature of the reaction rises less sharply and after reaching at a maximum level, it also starts decreasing albeit, less sharply. It signifies that even in this case the generation of heat is not a sustained one over the period of time although the situation is improved as compared to the first situation. In the ideal situation, when sodium silicate as well as potassium permanganate both are used as additives, the temperature during the reaction, rises less sharply and after reaching to a maximum value, it does not reduce over the time. This sustenance of heat generation is due to the reason that potassium permanganate reacts with the nascent hydrogen to produce heat and water as shown above. This additional heat produced, adds to the heat produced during the electrochemical reaction thus heat generation is sustained over a longer duration. The amount of active materials and additives used are same as shown in the working example—1 shown subsequently in the specification.

Referring to FIG. 2, it shows the effectiveness of potassium permanganate and sodium silicate in scavenging the hydrogen during the electrochemical reaction. The figure shows the hydrogen evolution profile with respect to the time during electrochemical process of the electrochemically reacting composition in a typical situation. In a situation, when potassium permanganate and sodium silicate are not used as additives, the amount of hydrogen, evolved during the reaction, increases with time and after some time it reaches to a plateau position. In case when only sodium silicate is used as an additive in the composition, the amount of hydrogen, evolved during the reaction, is reduced initially. However, after certain period, the amount of hydrogen, evolved during the reaction, starts rising again. In the ideal situation, when sodium silicate as well as potassium permanganate both are used as additives, the amount of hydrogen, evolved during the reaction, is dropped significantly and it does not rise considerably over the period. The amount of active materials and additives used are same as shown in the working example—1 shown subsequently in the specification.

FIG. 2 clearly establishes the important role of potassium permanganate, together with sodium silicate, as an effective scavenger of hydrogen.

According to the present invention, the process for the preparation of electrochemically reacting composition of the present comprises of following steps.

(i) Preparation of Active Materials 10-90%, preferably 15-50% by weight of active materials, magnesium having particle size varying from 1-500 μm, 10-90%, preferably, 40-75% by weight of active materials, almunium having particle size varying from 2-100 μm and 0-15%, preferably 7-12% by weight of active materials iron particles having particle size varying from 20-200 μm, all commercially available, are taken in the container of a conventional ball mill.

(ii) Addition of Filler Material

To the above mix, silica sand in quantity 5-50%, preferably 5-25% by weight of active materials is added as a filler material. Silica sand act as a heat sink and helps in alloying operation when the active materials are mixed in the ball mill. Alternatively organic fillers like poly ethylene or poly propylene can also be used as filler materials.

(iii) Preparation of Alloy by Ball Milling

The above mix, prepared in step (ii) is ball milled, preferably under inert atmosphere of Argon, for a period of 4-6 hours using a conventional ball mill. Once the milling operation is complete, a mix of alloy of reactive materials and filler material is obtained. This mix is transferred in another container after the completion of the milling operation.

(iv) Addition of Hydrogen Scavenger

Next, a hydrogen scavenger, 5-30%, preferably 5-20% by weight of active materials, commercially available potassium permanganate is added to this alloy and mixed thoroughly to obtain a homogeneous mix. Alternatively, commercially available copper chloride and ferric chloride can also be utilized as hydrogen scavengers. This scavenger can also be directly added to the water used for the electrolytic reaction.

(v) Mixing of Other Additives

To the homogeneous mix, obtained from step (iv), 0.20% preferably 0-10% weight wise over the entire active materials, an additive sodium silicate is mixed. Sodium silicate helps in improving the generation of heat during electrochemical reaction by gelling operation. It is taken preferably, wt wise 0-10% of the weight of composition. Alternatively this can also be directly added to the water used for the electrolytic reaction.

(vi) Addition of Salt for Electrolyte

To the homogeneous mix prepared in step (v), sodium chloride taken 2-10%, preferably 5-10% weight wise over the entire active materials is added. Alternatively, any salt of strong acid and strong/weak base such as potassium chloride, calcium chloride, ferrous sulphate can be added. Alternatively this can also be directly added to the water used for the electrolytic reaction.

(vii) Compacting of the Homogeneous Mix

The entire homogeneous mix, prepared in step (v), is compacted through a pressing machine to give it any convenient shape such as strip or pellets.

(viii) Storage of the Composition

Finally, the compacted electrochemically reacting composition is stored in air tight containers to avoid the ingress of water.

The invention will now be illustrated with working examples which are typical examples to illustrate the working of the invention and are not intended to be taken restrictively to imply and limitation on the scope of the present invention.

Example—1

In the lab, electrochemically reacting composition was made by mixing 40 gm of magnesium powder of approximately 20-400 micron size. 60 gm of aluminum powder of 5-100 micron size, 10 gm of iron powder of 20-120 micron size and 10 gm of silica sand of 15-100 micron size. This mixture was ball milled for five hours in the inert atmosphere of Argon in a conventional ball mill. After the completion of ball milling operation, 12 gm sodium chloride and 10 gm of potassium permanganate were added to it. The entire composition was reacted with 240 ml of 5% solution of sodium silicate in water.

Example—2

In the lab, electrochemically reacting composition was made by mixing 80 gm of magnesium powder of approximately 20-400 micron size, 20 gm of almunium powder of 5-100 micron size, 10 gm of iron powder of 20-120 micron size and 10 gm of silica sand of 15-100 micron size. This mixture was ball milled for five hours in the inert atmosphere of Argon in a conventional ball mill. After the completion of ball milling operation, 12 gm potassium chloride and 10 gm of potassium permanganate are added to it. The entire composition was reacted with 240 ml of water for producing heat.

It is to be understood that the process of the present invention is susceptible to adaptation, changes and modifications by those skilled in the art. Such adaptations changes and modifications are intended to be within the scope of the present invention, which is further set forth with the following claims.

We claim:

1. An electrochemically reacting composition comprising active materials aluminum, magnesium and iron, a filler material, a hydrogen scavenger, an additive and an electrolyte;
    wherein said magnesium comprises 10-90% by weight of said active materials,
    wherein said aluminum comprises 10-90% by weight of said active materials,
    wherein said iron comprises 0-15% by weight of said active materials,
    wherein said filler material comprises 5-50% by weight of said active materials,
    wherein said hydrogen scavenger is potassium permanganate and it comprises 5-30% by weight of said active materials, and
    wherein said additive comprises 0-20% by weight of said active materials.

2. The composition as claimed in claim 1, wherein said magnesium comprises 15-50% by weight with a particle size varying from 1-500 μm.

3. The composition as claimed in claim 1, wherein said aluminum comprises 40-75% by weight with a particle size varying from 2-100 μm.

4. The composition as claimed in claim 1, wherein said iron comprises 7-12% by weight with a particle size varying from 20-200 μm.

5. The composition as claimed in claim 1, wherein said filler comprises 5-25% by weight of said active materials.

6. The composition as claimed in claim 1, wherein said hydrogen scavenger comprises 5-20% by weight of the said active materials.

7. The composition as claimed in claim 1, wherein said additive comprises 0-10% by weight of said active materials.

8. The composition as claimed in claim 1, wherein said electrolyte is a salt of strong active and strong or weak base.

9. The composition as claimed in claim 8, wherein said salt is selected from the group consisting of potassium chloride, sodium chloride and ferrous sulphate.

10. The composition as claimed in claim 1, wherein said filler is selected from the group consisting of silica sand and an organic filler.

11. The composition as claimed in claim 10, wherein said organic filler is polyethylene or polypropylene.

12. A composition prepared by a process comprising:
    (i) preparing active materials by placing commercially available 10-90% magnesium by weight of the entire active materials, having particle size varying from 1-500 μm, 10-90% aluminum by weight of the entire active materials, having particle size varying from 2-100 μm, and 0-15% iron weight wise of the entire active materials and having particle size varying from 20-200 in the container of a conventional ball mill;
    (ii) adding to said active materials a filler material 5-50% weight wise over the weight of the said active materials;
    (iii) ball milling the mix of said active materials and the said filler material for about 4-6 hours and transferring the entire mix to another container after completion of the ball milling operation;
    (iv) adding a hydrogen scavenger 5-30% weight wise over the entire weight of the active materials and mixing thoroughly to obtain a homogenous mix;
    (v) adding an additive 2-20% weight wise over the entire active materials to the homogenous mix obtained from step (iv);
    (vi) adding any salt of strong acid and strongly or weak base 2-10% weight wise over the weight of the entire active materials to the mix obtained from step (v);
    (vii) compacting of the entire mix obtained from step (v) through a conventional pressing machine and giving it a desirable shape such as strip or pellet; and
    (viii) storing the compacted and cut electrochemical heat source in air tight containers such as pouch to avoid ingress of water.

13. The composition of claim 12, wherein said composition comprises the following amounts of constituents by weight of the active materials: magnesium 15-50%, aluminum 40-75%, iron 7-12%, filler 5-25%, hydrogen scavenger 5-20%, additive 2-10%, and salt 5-10%.

14. The composition of claim 12, wherein step (iii) is carried out in an inert argon atmosphere.

* * * * *

UNITED STATES PATENT AND TRADEMARK OFFICE
CERTIFICATE OF CORRECTION

PATENT NO. : 8,646,443 B2  Page 1 of 1
APPLICATION NO. : 10/517002
DATED : February 11, 2014
INVENTOR(S) : Pramil Chandra Deb et al.

It is certified that error appears in the above-identified patent and that said Letters Patent is hereby corrected as shown below:

In the Claims

Column 8, Line 28, Claim 12, delete "20-200" and insert -- 20-200 μm --

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,646,443 B2
APPLICATION NO. : 10/517002
DATED : February 11, 2014
INVENTOR(S) : Deb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2752 days.

Signed and Sealed this
Twenty-ninth Day of September, 2015

Michelle K. Lee
*Director of the United States Patent and Trademark Office*